(12) United States Patent
Nielsen et al.

(10) Patent No.: US 8,520,224 B2
(45) Date of Patent: Aug. 27, 2013

(54) METHOD OF SCANNING TO A FIELD THAT COVERS A DELIMITED AREA OF A DOCUMENT REPEATEDLY

(75) Inventors: Lars Stig Nielsen, Liseleje (DK); Jacob Meibom, Copenhagen Ø (DK)

(73) Assignee: JL Holdings ApS, Kobenhavn K (DK)

( * ) Notice: Subject to any disclaimer, the term of this patent is extended or adjusted under 35 U.S.C. 154(b) by 239 days.

(21) Appl. No.: 12/667,953

(22) PCT Filed: Mar. 5, 2009

(86) PCT No.: PCT/EP2009/052615
§ 371 (c)(1),
(2), (4) Date: Aug. 11, 2010

(87) PCT Pub. No.: WO2009/109626
PCT Pub. Date: Sep. 11, 2009

(65) Prior Publication Data
US 2010/0321714 A1 Dec. 23, 2010

Related U.S. Application Data

(60) Provisional application No. 61/064,681, filed on Mar. 19, 2008.

(30) Foreign Application Priority Data

Mar. 7, 2008 (DK) .................. 2008 00345

(51) Int. Cl.
*G06K 15/02* (2006.01)
(52) U.S. Cl.
USPC ....................................... 358/1.11

(58) Field of Classification Search
USPC ........................................................ 358/1.11
See application file for complete search history.

(56) References Cited

U.S. PATENT DOCUMENTS

| 4,272,756 A | 6/1981 | Kakumoto et al. |
| 4,731,861 A | 3/1988 | Blanton et al. |

(Continued)

FOREIGN PATENT DOCUMENTS

| EP | 0 465 818 A2 | 1/1992 |
| EP | 1 351 163 A2 | 10/2003 |

(Continued)

OTHER PUBLICATIONS

International Search Report (PCT/ISA/210) dated Jul. 13, 2009 for PCT/EP2009/052615.

*Primary Examiner* — Qian Yang
(74) *Attorney, Agent, or Firm* — Buchanan Ingersoll & Rooney PC

(57) ABSTRACT

A computer-implemented method of scanning a document (e.g. a newspaper or a book) is provided where the text may be legally protected from unauthorized copying, comprising the steps of: acquiring to a memory at least one recording confined to a field that covers a delimited area of a document; processing the at least one recording to perform character recognition; when a character is recognized, registering it in a memory, and performing the above steps repeatedly while recording at shifted positions so as to progressively obtain a string of characters; and evaluating the string against a predefined condition; if condition is not satisfied, determining whether to clear from the memory at least a portion of the at least one recording; if condition is satisfied, provide an output and clear from the memory at least a portion of the string and at least a portion of the at least one recording.

31 Claims, 5 Drawing Sheets

(56) References Cited

U.S. PATENT DOCUMENTS

| | | |
|---|---|---|
| 5,109,439 A | 4/1992 | Froessl |
| 6,545,385 B2 | 4/2003 | Miller et al. |
| 6,904,182 B1 | 6/2005 | Simard et al. |
| 6,904,183 B2 | 6/2005 | Slatter |
| 2002/0041713 A1 | 4/2002 | Imagawa et al. |
| 2005/0076013 A1* | 4/2005 | Hilbert et al. .......... 707/3 |
| 2008/0021938 A1* | 1/2008 | Jha ................. 707/205 |
| 2008/0148147 A1* | 6/2008 | Poston et al. .......... 715/273 |

FOREIGN PATENT DOCUMENTS

| | | |
|---|---|---|
| WO | WO 02/17166 A2 | 2/2002 |
| WO | WO 2008/064378 A1 | 5/2008 |

* cited by examiner a)

b)

METHOD OF SCANNING TO A FIELD THAT COVERS A DELIMITED AREA OF A DOCUMENT REPEATEDLY

TECHNICAL FIELD

This invention relates to computer-implemented processing of digital images or recordings acquired by optical scanning of a document that contains text e.g. printed newspaper pages or other forms of display of a text, where the text may be legally protected from unauthorized copying.

BACKGROUND

The directive 2001/29/EC of the European Parliament and of the EU Council of 22 May 2001 on the harmonisation of copyright-laws in the EU-countries set out the rules for copying and scanning. The equivalent US legislation is the Digital Millennium Copyright Act (DMCA).

Scanning and copying can be performed by means of a conventional scanner, but since conventional scanning of copyright-protected documents violates copyright laws, there is a need for a solution to this problem.

The EU Copyright Directive Article 2 provides the most fundamental "copy" right. It provides exclusive rights over the reproduction of "direct or indirect, temporary or permanent" copies of works to performers, phonogram producers, film producers, broadcasting organisations and authors.

Article 5 in the EU Copyright Directive sets out the limitations and exceptions that may apply to the rights provided in Article 2. The mandatory exception to the reproduction right in Article 5(1) provides for "transient and incidental" reproduction that is an "essential and integral" part of network transmission by an intermediary or allows lawful use of a work with no "independent economic significance."

It also prevents right holders from controlling all access to works through digital technologies, which by their very design make temporary "copies" of works as they are transferred from a medium such as a DVD to the player's memory for processing, and then to a display or speaker.

Monitoring of copyright-protected publications such as newspapers, magazines, trade journals, scientific journals, and other periodicals is performed systematically e.g. by companies in the media monitoring business for serving their clients by identifying articles or other text sections of interest. Monitoring is performed to help client companies and individuals to keep track of how often and to which degree they are mentioned in the news media.

Conventionally monitoring is based on manual reading of e.g. newspapers. When the newspapers are received e.g. at the media-monitoring company, they are handed over to qualified human readers, who speed-read through the paper looking for relevant articles e.g. articles where their clients are mentioned. The readers are looking for words like company names, names of individuals, and/or other keywords representing certain subjects, topics or themes to determine which of the articles are relevant articles.

The reader marks the keywords when finding them on a page of the newspaper. When the whole page has been read and all keywords have been marked, the reader performs an evaluation keyword-by-keyword to determine whether the article is relevant for a client. If the article is found to be relevant, the reader or an assistant then performs a physical cutting of the article(s) for the client and sends it to him.

The time-consuming part of the process is the time spent on finding the keywords. The reading time pr. page starting at the upper left corner and ending at the right bottom corner is fairly invariable to the number of keywords on a page. This results in a high time-consumption pr. cutting if there are only a few relevant articles in a newspaper. Most of this time spent on reading is thus inefficient.

To some extent automation of the process is possible by use of conventional scanners that scan the entire newspaper page-by-page and produce a digital image of the newspaper pages for the purpose of storing an electronic version, e.g. in a JPG, TIFF or PDF format, for storage in a file system or a database. Subsequently, each file is retrieved for Optical Character Recognition in order to produce files where recognised characters are each represented according to a certain encoding scheme (e.g. ASCII). These files are also stored in a file system or database. Further, a so-called search engine is loaded with a set of keywords and the search engine retrieves the files where characters and sequences of characters are encoded in order to provide an output in the form of cutting lists. A cutting list provides the person who is cutting the articles from the newspapers with information that directs him to the page in the physical newspaper—it stipulates the title of the article to be cut and its approximate location. This automated process gives a good increase in productivity over the manual process.

However, since the digital image represents an electronic copy of the original material this process is considered a violation of the author's copyrights under many legislations. Under certain legislations even showing the scanned image on a display screen is considered an act violating the author's copyrights. The digital images are not directly searchable for text, but require a conversion to a coded digital form by means of Optical Character Recognition, OCR. However, output from this conversion i.e. the coded digital form will also be considered a violation of the copyrights.

In some countries it may be considered not to be a violation of the author's copyright if the electronic copy is "transient and incidental" and an "essential and integral" part of a search-process or summary writing.

If the traditional process of media monitoring by means of manual reading of textual media is automated, copies of the textual media will be made. The creation of copies of textual media is a problem in relation to copyright laws. Copyright laws can thus be a hindrance for automating media monitoring. Thus, automation of the monitoring of textual media and prevention of violating copyright laws are problems which remain to be solved. Thus there is a need for a technical solution to solve the problem of automating a monitoring of textual media (e.g. news papers, books) and the problem of avoiding violation of the copyright laws.

PRIOR ART

U.S. Pat. No. 6,904,183 B2 discloses an electronic image capture apparatus comprising an electronic camera having a detector and a lens with a field of view which is adapted to limit the radiation incident upon the detector. An actuator is provided to move the camera and its field of view across the document and a controller is provided to acquire a set of overlapping sub-images corresponding to different areas of the document. Processing means are provided to form a composite image of the portion of the document covered by the set of sub-images. A set of sub-images is produced which each comprises a data set of characters corresponding to characters appearing in a respective sub-image. The contents of each of the sub-images are stitched into a blank text document to produce a complete composite text document containing the textual content of the scanned document. Sub-images are first passed through an optical character recognition (OCR) routine prior to stitching and stitching is thus performed at a character level. Such a scanner may have the advantage of occupying less desk space than a so-called flatbed scanner.

The above application solves the problem of automation of text scanning of a document. But regarding copyright laws this is not an issue that the above application or other applications neither address nor solve, since the document in the above application is reproduced in digital form.

Since copying is a violation against copyright laws, this issue needs to be solved, when document scanning is conducted on printed text media such as news papers or books or when scanning is conducted on electronically displayed text documents, such as e-books.

Therefore, the problems of automating a monitoring of news media and avoiding violation of the copyright laws are not solved in the prior art.

SUMMARY

Disclosed is a computer-implemented method of scanning a document, comprising the steps of:
    acquiring to a memory at least one recording confined to a field that covers a delimited area of a document;
    processing the at least one recording to perform character recognition;
    when a character is recognized, registering it in a memory; and performing the above steps repeatedly while recording at shifted positions so as to progressively obtain a string of characters;
CHARACTERIZED in
    evaluating the string against a predefined condition;
    if condition is not satisfied, determining whether to clear from the memory at least a portion of the at least one recording;
    if condition is satisfied, provide an output and clear from the memory at least a portion of the string and at least a portion of the at least one recording.

It is an advantage, that when a condition is satisfied, then an output is provided, and at least a portion of the string and a portion of the at least one recording, from which the output is derived, are cleared in order to avoid making copies of the document and avoid compromising copy right law. If the condition is not satisfied, it is determined whether to clear at least a portion of the recording in order to avoid an overflow over a threshold. It may be avoided that too much information about the document is stored, and it may be ensured that notice can be taken and that at least a portion of the recording may be cleared before an upper-limit or threshold of number of recordings is reached. Information about characters is stored in the memory, and this information may be cleared as the scanning progresses, e.g. when a word is recognised and outputted. A scanning by means of this method may be denoted as a peephole scanning.

Thus, the hardware or software of the computer and related apparatus, equipment and/or machinery, which perform the scanning of the document, is adjusted so that it functions in a legally correct manner in relation to copyright laws. If nothing of the information indicative about the content of the document is cleared from the memory, copyright laws are violated. On the contrary, if the entire information indicative about the content of the document is cleared, there will be no information available for the monitoring of the textual media. The invention provides the method described above which is in between clearing nothing and clearing everything, since, in this invention, the selected action of clearing, when an output is provided, makes it possible to perform an automatic monitoring of textual media and at the same time avoid violating copyright laws.

Thus the invention solves the problem of automating the process of monitoring a textual media by the computer-implemented scanning method described above, and the invention solves the problem of avoiding violation of copyright laws by clearing, from the memory, a portion of the information indicative about the content of the document, so that there will never exist a complete copy of the document in the memory.

The peephole scanning can be performed by moving the image field to a shifted position and acquiring a recording with a camera. However, the peephole can also be performed by having more cameras mounted above the document page and acquiring recordings by using the cameras in turn. Furthermore, the peephole scanning may also be performed by e.g. video recording of a screen displaying the document or other forms of serialised document representation.

When a string of characters is evaluated and an output is made, part of the string and part of the recording are cleared from the memory in order to preclude that copies of the document or parts of the document are created during the scanning.

A further advantage of this embodiment is that if either an entire word or a part of a word is found in the string of characters, this information may not be cleared before an output is provided. Thus in this case the desired information can be an entire word or a part of a word.

If there is no indication of a word in a string of characters, at least a portion of the recordings may also be cleared, so that eventually no content or no information indicative about the content of the document will be stored.

A further advantage is that the technical effect of clearing information from the memory is that the amount of stored information is reduced, and thus the size of storage means and/or memory usage can be reduced and/or occupy less space compared to if all information was stored.

Besides the advantages mentioned above, the invention comprises the known technical effects and advantages of automation, such as being fast and reliable, reducing the cost of manual work performed by humans, reducing the errors and irregularities which humans may perform etc.

Furthermore, it is an advantage that less memory or less storage capacity for data memory may be needed compared to in prior art, since data is cleared and deleted from the memory continually and regularly during the scanning of the document.

Characters may be letters, symbols, signs and/or graphemes such as alphabetic letters, Chinese characters, numerals, punctuation marks, and all the individual symbols in any of the world's writing systems.

In one embodiment, if the predefined condition is not satisfied, determining whether to clear from the memory at least a portion of the at least one recording, comprises:
    determining the number of evaluated characters; and
    if less than a predefined number of characters is evaluated, at least a portion of the at least one recording is not cleared; and
    if more than or equal to a predefined number of characters is evaluated, at least a portion of the at least one recording is cleared.

An advantage of this embodiment is that at least a portion of the at least one recording is cleared from the memory, if more than or equal to a predefined number of characters have been evaluated. Thus this embodiment ensures that an upper-limit or threshold of information indicative about the content of the document is not exceeded. However, if less than a predefined number of characters is evaluated, at least a portion of the at least one recording is not cleared, since more information indicative about the content of the document may be stored before clearing.

In one embodiment the method further comprises determining whether to clear from the memory at least a portion of the string, if condition is not satisfied.

It is an advantage that at least a portion of the string is cleared from the memory, if the condition is not satisfied, because this may reduce the information indicative about the content of the document.

In one embodiment the predefined condition comprises that the string of characters comprises or is identified as at least one word. An advantage of this embodiment is that, when the string of characters comprises a word, the word will be registered, and at least a portion of the string and the recording(s), from which the word is derived, is cleared to avoid making copies of the document and avoid violating copy right laws.

In one embodiment an index list is provided comprising the at least one word. An advantage of this embodiment is that the recognised words are registered in an index-list, whereby this information is indicative about the content of the document and can be accessed for e.g. subsequently matching with a keyword list.

In one embodiment the method comprises clearing, leaving out or omitting the at least one word from the index-list, if the at least one word matches one of a predefined stop-word.

It is an advantage of this embodiment that not all words from the document are provided in the index-list, since some words or groups of words may never be defined as keywords. By leaving out these so called stop-words from the index-list, the index-list may be shorter than if all words were included in the index-list, and information may be easier to access, when the index-list does not contain undesired words and information. These stop-words or groups of stop-words may e.g. be words such as "for example", "and", "and so on", "among other", "or", "the", "a", "etc." and/or the like. A definition of stop-words may be that a stop-word or a group of stop-words do not represent meaningful, valuable or important information about the content of the document. The opposite of a stop-word may be defined as a hit-word, e.g. a word which contains information about the content of the document. So the index-list may be defined as a list containing words which contain meaningful information about the content of the document.

Alternatively, the stop-words may be cleared from the memory before they are even outputted as a word, i.e. the method comprises clearing, leaving out or omitting the at least one word, if the word matches one of a predefined stop-words.

Furthermore the method may then comprise that an index-list is provided comprising the at least one word derived from the string of characters, which is not cleared, left out or omitted.

In one embodiment a word is identified in that there is a space before and after the word.

An advantage of this embodiment is that words can be identified easily by this method. A space may be a space between words in a sentence. The space may be a blank or gap, where there are no characters and the document thus contains no information in these locations. The expressions "before" and "after" may be defined as meaning immediately and/or directly before and after, i.e. a space may be the neighbour place, site, position or area right next to the word.

If a word is the first word in a text or the first word after a line spacing or a line shift, there may not be a space before the word, but only a space after the word.

In one embodiment a word is identified in that there is a space before the word and a character different from a letter after the word.

An advantage of this embodiment is that by this method the last word in a sentence may be identified. After the last word in a sentence there may not be a space, but a full stop, a comma, an exclamation mark, a question mark or the like.

Alternatively and/or additionally a word may comprise superscript and/or subscript text, a word may be framed by quotation-marks, a word may exist in a picture, a word may be divided into two or more lines by means of a hyphen, a word may be hyphenated etc.

In one embodiment a word is identified by means of a database comprising every word in one or more languages, and if there is a match or convergence between the string of characters and a word in the database, or if the string of characters is recognised as one of the words in the database, said string of characters is defined as a word.

An advantage of this embodiment is that words may be identified by being recognized in a database comprising the words of the language in which the text of the document is written. A language may be defined as a written language and/or a spoken language.

In one embodiment the output is the at least one word which is identified. An advantage of this embodiment is that by outputting the at least one word, it is possible to detect information indicative about the content of the document.

In one embodiment the output is a reference to a location in the document, where the at least one word is located.

An advantage of this embodiment is that the output is made as a reference of the position, location or area of the word in the document, so it can be found afterwards, when the recording and the word are cleared from the memory, thus a reference to the location of the recording containing information about the word location is given. The location may be such as the approximate location of the recording. It is advantageous to acquire recordings with a position determination, which will make it easier afterwards to give a reference to the location of the word in the document.

In one embodiment information about location or position in the document of the at least one word is generated and stored.

In one embodiment the at least one word is represented as a code.

An advantage of this embodiment is that the output of the string of characters identified as a word can be represented by means of any suitable codes, such as characters, letters, symbols, signs, reference numbers, index to list of keywords etc.

In one embodiment the output comprises the index-list and a reference to a position representing the location of the corresponding word in the document subjected to scanning.

An advantage of this embodiment is that the index-list and a location reference are outputted, since thereby it is possible to detect information indicative about the content of the document and the location of the words in the document.

In one embodiment a generated keyword list comprises a number of predetermined keywords.

An advantage of this embodiment is that, by generating a keyword list, it may be possible to detect keywords in the document. Keywords may be words which are chosen as the words to search for in a document, because they may be important for e.g. a client wishing to know how a name, company etc. is mentioned in newspapers etc. A keyword may be the name of a person, a company name, a name of a product etc.

In one embodiment the keyword list is compared to the index-list, and if there is a match between a keyword in the keyword list and a word in the index-list, this word is extracted, recorded or noted.

An advantage of this embodiment is that the when the index-list is compared with the predefined keyword list, a match between the two lists may be found, and the words which occur in both the index-list and the keyword-list are extracted.

It is an advantage that a content-based evaluation of the electronic input may be performed in order to find the relevant pieces of information of the document, i.e. the keywords. This may be defined as a filtering, and a filtering of the content, or filtering of information indicative about the content, may thus be performed. The content of the document may be filtered in order to extract the information that one wishes to obtain and filter out the rest.

In order to perform filtering of the content, filter properties may be defined. Filter properties can be defined by means of predefined conditions. A predefined condition can e.g. be recognition of a word, recognition of a keyword, maximum length of the string of characters etc. If recognition of keywords is a filter property, then, in accordance with this, only keywords pass through the filter, and the rest of the information in the document is left behind. By filtering the content of the document, no complete copy of the document is made, and only the desired information is extracted from the document.

The desired information may be less information than all information in a document, so that only a part of the content of the document is extracted, and thus a part of the document may never be provided as an output.

In practice, when the filter recognises a word or a keyword, the word or keyword and the position of it in the document may be stored. As soon as the word or keyword and its position are stored, the recording, e.g. image, which contained the word or the keyword can be deleted, because all the information, which is needed about that word or keyword, is registered. This way there is not generated any copies of the document, since the scanning relates to a filtering process and not to copy-production.

A further advantage of this embodiment is that words or keywords can subsequently be arranged and subsequently re-found for use in cutting text out of a document, list-generation, abstract-writing etc. A document template showing the position of words or keywords in the document may be provided and may serve to give an overview of the physical location of words or keywords in the original document without making a copy of the document. All other words than keywords can e.g. be denoted by grey areas in the document template.

The font size and e.g. grey-scale colour of words or keywords can also be indicated in the document template, so that it is possible to determine if a word or keyword is located in a headline, in a body text etc.

A further advantage of this embodiment is that the position of words or keywords in the document can be found after scanning, and this information can be used to compare the position of words or keywords relative to each other, to determine if certain words or keywords are located near each other. Word or keywords may have special meanings when in combination with other words or keywords, and the location of them relative to each other may contain information which is important to the client.

Information about position of a word or a keyword can be identified by different means, such as:
 by means of coordinates of the word or keyword;
 by means of the position of the line in which the word or keyword is;
 by means of which number of word in the document the word or keyword is;
 by means of typographical symbols, wherein typographical symbols comprise full stop, comma and the like;
 by means of which number of sentence in the document the word or keyword is in.
 by means of which number of section or paragraph the word or keyword is in.

In one embodiment the method comprises stitching together selected recordings to a compounded recording.

An advantage of this embodiment is that it is possible to stitch together selected recordings to a larger recording or image. This is advantageous since the field size will sometimes be much smaller than the font size of a character (small recording or image size) if the scanning is performed of a newspaper which contains many different font sizes of characters, i.e. large character font sizes of headlines and smaller character font sizes of body text, caption etc. And since it may be preferred that the field dimension is less than e.g. five times the font size of the smallest character subject for character recognition, the larger characters will often extend across more than one recording, and it is therefore necessary to stitch selected recordings together.

The font sizes of the characters on a document page may be provided to the peephole scanner as an input, e.g. by being keyed in by an operator or the like.

In one embodiment the compounded recording is processed to perform recognition of a character extending across multiple selected recordings.

An advantage of this embodiment is that, after stitching together recordings, character recognition of a character which extends across multiple selected recordings can be performed, since the compounded recording will provide an image or record of the complete character.

In one embodiment a step of stitching together selected recordings to a compounded recording is performed, when processing of the at least one recording to recognize a character did not result in recognition of a character. An advantage of this embodiment is that, when it is not possible to recognise a character from the processing of the at least one recording, stitching and processing of the compounded recording is performed. In this way characters can be determined even though they extend across more than one recording.

In one embodiment the predefined condition comprises whether stitched compounded recordings result in recognition of a character when a predefined number of recordings has been stitched.

An advantage of this embodiment is that notice is taken and the process may be stopped if the compounded recording does not resemble characters. The compounded recording is then likely to be part of a picture. The predefined number of stitched compounded recordings may ensure that a complete picture will not be processed unintentionally due to the scanner being in the process of searching for characters. By this method it is ensured that copyright laws are not violated by a suitable predefined maximum number of stitched recordings being chosen.

A further advantage of this embodiment is to ensure that notice will be taken before an upper-limit or threshold of number of recordings is reached. If too many recordings are evaluated before stopping, the scanning copyright laws might be violated, but this embodiment ensures that this will not happen.

In one embodiment, the predefined condition comprises that the same colour occurs in neighbour recordings.

An advantage of this embodiment is that if neighbour recordings, i.e. recordings which are next to each other, contains the same colour, it will be likely that these recordings are of characters and not pictures. On the other hand, if neighbour recordings do not contain the same colour, it is likely that they are recordings of a picture, a photo, a drawing or the like. In order to avoid scanning a picture, the scanning of this part of the document will be cleared.

In one embodiment the compounded recording is cleared when a predefined condition is satisfied.

An advantage of this embodiment is that stitching of recordings can be cleared when a condition is satisfied, for instance that an output is made and all the desired information from a document is obtained. This way one will avoid making copies of a document and avoid violating copyright laws.

In one embodiment the predefined condition comprises that fewer than a predefined number of characters is evaluated.

An advantage of this embodiment is to ensure that the character recognition process will stop if the number of evaluated characters exceeds a predefined upper-limit or threshold. If too many characters are evaluated copyright laws might be violated, but this embodiment ensures that this will not happen.

In one embodiment the predefined condition comprises that the character font size is less than a predefined font size.

An advantage of this embodiment is that if the character font size is bigger than a maximum predefined font size, the character recognition process will stop in order to avoid scanning big characters, which otherwise might would have been a very time-consuming process, which may be unwanted.

In one embodiment the field is configured to have a dimension of 11 words arranged next to each other in a consecutive text, i.e. an unbroken text. Alternatively, the field is configured to have a dimension of 5 words next to each other in a consecutive text, 15 words next to each other in a consecutive text, 20 words next to each other in a consecutive text, 25 words next to each other in a consecutive text or the like. If the field comprises 11 words arranged next to each other in a consecutive text, the field may cover a width of a page in a book or the width of a document in the size of an A4 document, while the height of the field may be the size of the font. If scanning a multi-column page, such as a newspaper page, each column line may contain less than 11 words next to each other in a consecutive text and the width of the multi-column page may thus also contain less than 11 words next to each other in a consecutive text. The width of the multi-column page may contain more than 11 words, but these 11 words may not be next to each other in a consecutive text. Thus in one embodiment the field is configured to have a dimension corresponding to the width of the document and the height of the font size of the characters.

In one embodiment the field is configured so as to have a dimension less than five times the size of the smallest character subject to character recognition.

Alternatively, the field is configured to have a dimension which is defined such as:
- to have a dimension of 10 mm, 20 mm, 30 mm or the like;
- corresponding to a predefined number, e.g. 100 or 200, of fields per document page;
- relative to the biggest character font size;
- relative to the smallest character font size;
- relative to the document page size.

The advantage of these embodiments is that it is ensured that not too many characters are scanned in one recording since this could result in too much text being scanned and thus that copyright laws could unintentionally be violated. By ensuring that the field has a dimension e.g. less than five times the font size of the smallest character, it is not possible to scan too many characters unintentionally at one time.

It is also possible that the dimension of the field could be less than four times the font size of the smallest character, or less than six times the font size of the smallest character.

Preferably, entire words are scanned and recognised before the image(s) and the string of characters are cleared. But if many characters are scanned without a word being recognised, the string of characters and the images may be cleared without a word being recognised. This may be the case, if a text comprises a language or words that the character recognition system/software does not know, and thus characters and images may be cleared after a predefined number of recordings are made, to avoid having stored too much of a document, which may violate copyright laws.

In one embodiment at least two recordings are acquired simultaneously.

An advantage of this embodiment is that by e.g. acquiring more recordings at the same time vertically, the scanning process may become significantly faster. At the same time, the risk of recording too much text, which can be a violation against copyright law, will not exist, since by acquiring more recordings vertically, words and sentences written horizontally on a document page will not be recorded at the same time.

Each recording is eventually cleared, when the recording has been processed in order to perform optical character recognition and the words that occur are recognised and therefore no copies of the document are made.

Furthermore, in some languages and in some countries reading may take place from right to left on a page instead of from left to right, and/or vertically instead of horizontally, and/or from the bottom of a page to the top of the page instead as from the top of a page to the bottom of the page etc. Thus, scanning may also be performed from right to left on a page instead of from left to right, and/or vertically instead of horizontally, and/or from the bottom of a page to the top of the page instead as from the top of a page to the bottom of the page etc.

In some embodiments, the processing of the text on the document being scanned may comprise machine translation (MT), which is a field of computational linguistics where computer software is used to translate text from one language to another. Basically, machine translation performs simple substitution of words in one language for words in another language. The machine translation may be rule-based machine translation, example-based machine translation, statistical machine translation (SMT) etc.

In some embodiments, the processing of the text on the document being scanned may comprise rewording or rephrasing, i.e. the word or sentences of the text may be reworded or rephrased into different words or sentences of the same language with the same meaning as the original word or sentences. When using the method according to the present invention, for example three words are scanned, stored in the memory, and then processed. A meaning or sense of the three words is generated by means of a software program, and one or more synonymous words or a synonymous sentence for the three original words are generated. Hereby, an equivalent word, sentence or text of an original word, sentence or text is generated, having the same meaning or sense as the original but without violating copyright laws. It is understood that more or less than three words may be processed for rewording or rephrasing the original text or part of the text.

In some embodiments of a peephole scanning process, the document to be scanned is partly hidden or covered in first areas with a covering of some kind prior to scanning, and when the covered document has been scanned, and the content and image have been processed and deleted, then the document is again partly hidden or covered but now in opposite second areas with a covering of some kind prior to scanning.

It is an advantage that the scanning can be performed by partly covering the document to be scanned, and then afterwards partly covering the document in the opposite areas, since this provides that the scanning can be performed fast and effectively.

The present invention relates to different aspects including the method described above and in the following, and corresponding methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a computer-readable medium encoded with a program implementing the method according to any of the above embodiments when run on a computer.

A further aspect is a system comprising a scanning device and a computer loaded with a program implementing the method according to any of the above embodiment when the program is run on the computer.

A yet further aspect is a document scanner comprising:
a scanning head for acquiring at least one recording confined to a field that covers a delimited area of a document;
a processor adapted to recognize a character in the recording;
a data memory for storing the at least one recording and for storing a recognized character;
a program memory storing a set of executable program instructions on the processor to perform the method according to any of the embodiments.

BRIEF DESCRIPTION OF THE DRAWINGS

A detailed description of embodiments will be given below with reference to the drawing, in which.

DETAILED DESCRIPTION

The digital scanner of this invention scans documents without creating a digital copy of the document. At any given time of the scanning operation, the so called peephole scanner may only contain in its memory a few words or parts of words before clearing or overwriting the words or the parts of words. The information in the document can be saved by means of an index-list containing the words of the document. By this scan and search method the user should not infringe the respective authors' copyrights.

Figure 1:
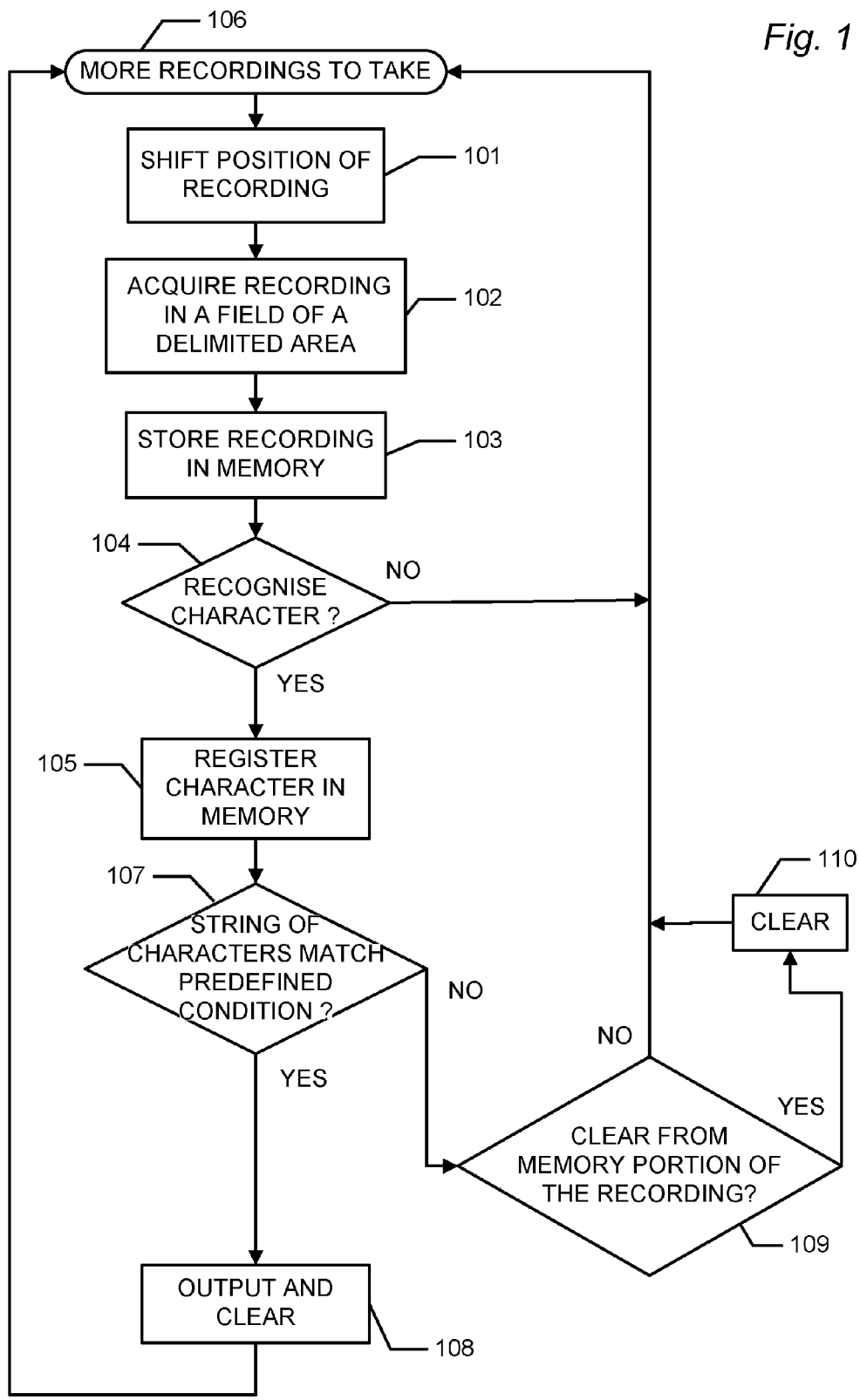
FIG. 1 shows a flowchart of the scanning method.

FIG. 1 shows a flowchart of the scanning method.

The scanning may be performed by shifting the position of recording 101, e.g. by the scanner moving over the surface of the document, e.g. a newspaper, in a sequential manner, and for each step the scanner acquires a recording, e.g. an image, in a field of the document 102. The field is preferably small, and the size of the field can be defined in different ways;
the field can be configured so as to have a dimension less than five times the font size of the smallest character subject for character recognition;
the field can be configured so as to have a dimension of 10 mm;
the field can be configured so as to have a dimension corresponding to a predefined number of recording or image fields per document page;
the field can be configured so as to have a dimension relative to the biggest character font size;
the field can be configured so as to have a dimension relative to the smallest character font size.
the field can be configured so as to have a dimension relative to the document page size.

As mentioned, the peephole scanning can be performed by moving the image field to a shifted position and acquiring a recording with a camera. Alternatively, the peephole scanning can also be performed by having more cameras mounted above the document page and acquiring recordings by using the cameras in turn. E.g. 100 cameras may be mounted above the document in a square, and the first camera in the upper right corner may acquire the first recording, the second camera next to the first, may acquire the second recording etc, until the entire document has been scanned.

The peephole scanning may also be performed by e.g. video recording of a screen displaying the electronic document, such as an electronic book or e-book. The document on the screen can be recorded either by scrolling the document up or down on the screen in front of a fixed peephole scanner, e.g. a video camera, or by moving a peephole scanner across the screen. In all cases the scanning can be performed such as horizontally or vertically. Furthermore, video screening may be performed by using a monitor-output from a computer, such as a Video Graphics Array (VGA) monitor-signal or the like. The monitor-signal carries serialised the electronic document to be displayed on the monitor. The peephole scanner may extract, from the serialised monitor-signal, a peephole window, e.g. 40 pixels in each of 40 consecutive scan lines, whereby a picture corresponding to the peephole window may be taken out of the monitor-signal. The peephole window may then be moved down or up or to the left or to the right or diagonally etc. and a new peephole window may be scanned by the peephole scanner. At each scan, a picture corresponding to the peephole window is taken. Recorded data may then be converted in a computer by means of character recognition and processed as described above.

After each step in the scanning-process the peephole scanner will contain a small recording, e.g. image, of a segment of the surface of the document 103. The recording may either be in greyscale, black/white, i.e. binary, or in colour.

Each recording- or image-segment is analysed by means of Optical Character Recognition (OCR) in order to determine if it contains a character, part of a character, a part of a picture, a blank field or combinations hereof 104.

If the recording-segment contains a character it is registered and transferred to a so called Wordbuilder 105, see below.

If the recording-segment contains a part of a character and the character thereby is not recognised, a next recording is made 106 and OCR is awaited to determine if the recordingsegments can be puzzled together to form a character, which can be transferred to the Wordbuilder.

If the recording-segment contains a picture or a part of a picture, the picture-part may be cleared in order to avoid making a copy a copyright-protected picture, photograph etc. The rest of the recording segment will be used to determine if it can be puzzled together with the subsequent recording-segment/s to form a character.

In a continuous process the Wordbuilder will collect the scanned characters and form words thereof. When a word is formed, the predefined condition of 107 is satisfied and an output is provided 108. Afterwards the recordings may continue to search the entire document.

If the string of characters does not match the predefined condition, it is determined 109 whether at least a portion of the at least one recording should be cleared from the memory. The determination of clearing 109 may be based on the number of evaluated characters. In one embodiment at least a portion of the at least one recording is not cleared, if the number of evaluated characters is less than a predefined number, and at least a portion of the at least one recording is cleared, if the number of evaluated characters is more than or equal to a predefined number. Whether at least a portion of the at least one recording is cleared in step 110 or not, the recordings and scanning may continue 106.

When finding words from a string of characters, the complete string of characters is examined, also when the string of characters forms a word which spreads out over e.g. two lines and the word is divided by means of a hyphen. The peephole scanner will thus continue scanning the next line, if a hyphen appears as the last character symbol on a present line.

The peephole scanner can function like a conventional scanner. A conventional scanner functions by setting an image field, taking an image and storing the image in a memory.

Furthermore conventional scanners can perform the tasks of OCR and Search Engine (SE) processing (e.g. finding keyword). When the conventional scanner performs these steps, the acquired information is stored, whereby a copy of the scanned document is made.

A scanner may be a flatbed scanner, a roller scanner, a feeder scanner or the like.

The peephole scanner may perform these same three tasks: the scanning, the character recognition and possibly a keyword matching. But the peephole scanner performs the tasks in one continuous operation and without creating any copies of the documents. A conventional scanner typically acquires an image of an entire document at the same time, whereas the peephole scanner only acquires an image of a delimited area of the document at a time.

Figure 2:
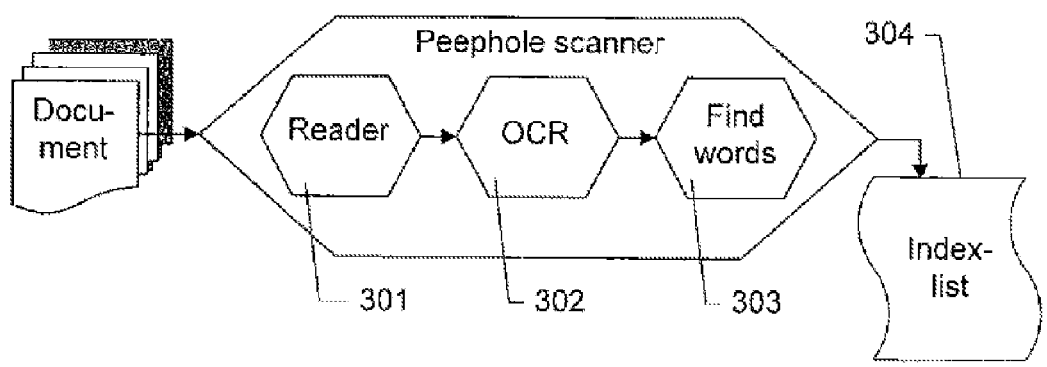
FIG. 2 shows the overall process of the peephole scanner.

FIG. 2 shows the overall process of the peephole scanner, whereas FIG. 1 shows a detailed process of it. The peephole scanner "reads" the document 301, performs optical character recognition (OCR) 302 and searches for words 303, which is as in FIG. 1. The resulting output is some kind of indication of which words the scanned document contains. This indication can be used for different purposes, such as for producing cutting lists, for producing index lists, for making abstract writing possible etc. 304

The peephole scanner may combine hardware, firmware and software components.

Figure 3:
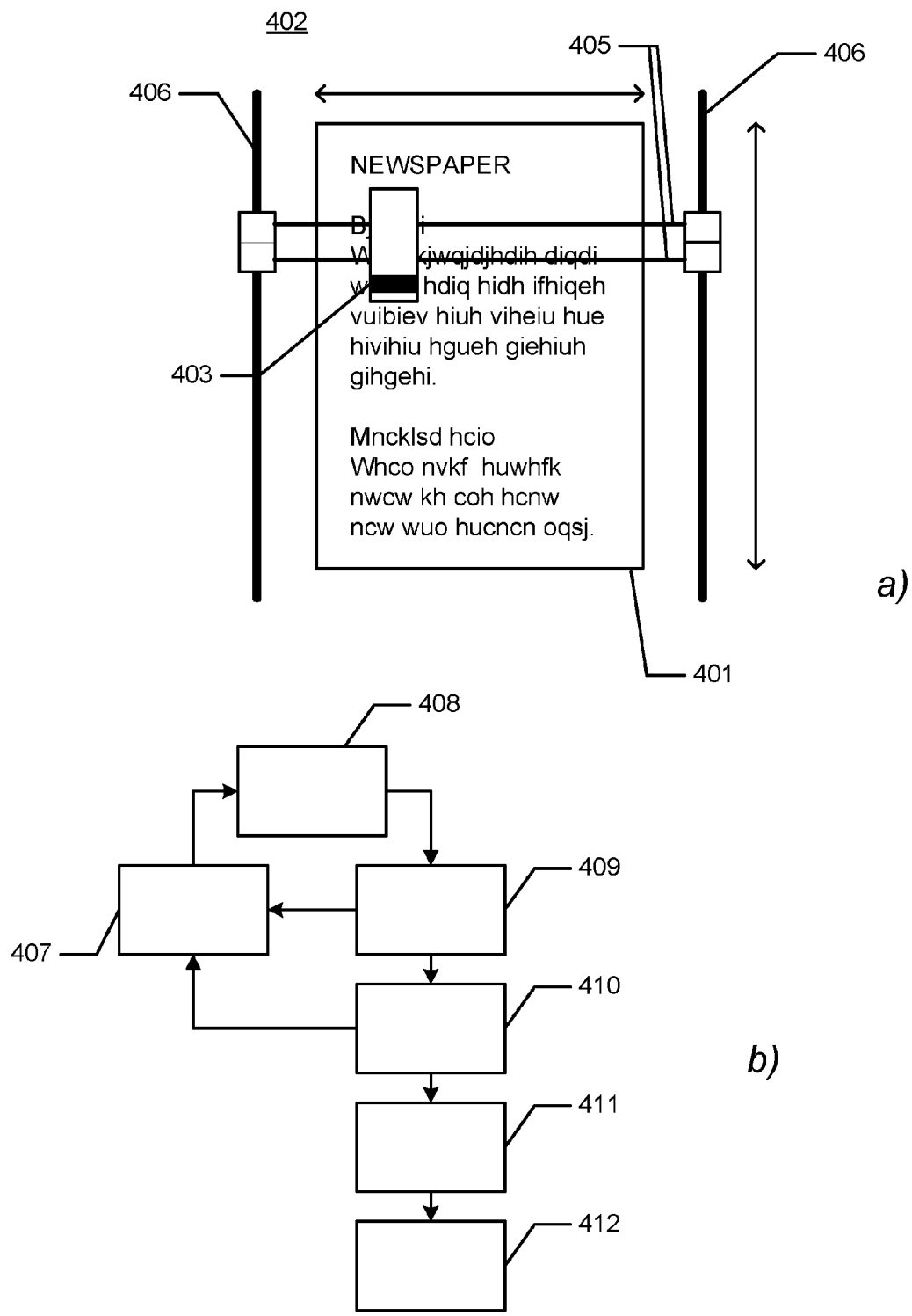
FIG. 3 shows an example of a peephole scanning process.

FIG. 3 shows an example of a peephole scanning process, which in overall terms functions like in FIG. 1. In FIG. 3a) a document page 401 is placed under the scanner 402. The reading-head 403 of the scanner is arranged on track(s) 405 which can move on glider(s) 406 in order to move over the entire surface of the document. The reading-head 403 is connected to a reading-head movement controller 408 and a scan sequencer (SS) 407, see FIG. 3b), by means of a flat cable, a USB connection, an infra-red communication or the like.

In one example the reading-head is a CCD-array of 100×100 pixels with an 8 bit greyscale resolution. The peephole therefore contains 10000 pixels in a physical window field, corresponding to 1 cm×1 cm, which equals 1 pro mine of a tabloid page size.

Even though one example of a reading-head is mentioned here, it is understood that the reading-head can have any specifications.

In FIG. 3b the scan sequencer (SS) 407 controls the reading-head movement 408.

In general the movements of the reading-head are from left to right with a return-cycle. This sequence can be altered if the outcome of the optical character recognition (OCR) 409 and the jigsaw OCR 410 (see below) sets the stage for a request to move the reading-head in another way, such as horizontal left, vertical down or diagonal up.

The reading-head movement 408 may be controlled by a TWAIN interface, which is a standard for image acquisition devices. A TWAIN interface may control the position of a scanner reading-head, i.e. the x, y coordinates of the reading-head, and the increase in coordinates, i.e. $\Delta x$, $\Delta y$ etc.

The OCR 409 performs a series of tasks. It may search the inner area of the peephole field to locate one or more complete characters, then it may search the border to locate shapes which could form part of a character. It looks for pieces of vertical and horizontal borderlines. It may look for line-spaces and evaluates alignment. It may look for continuation signs and column separation spaces. It may look for mono-grey-tone shapes which could be part of a larger character. It may look for areas with varying grey-tone, which could be part of a picture. Recognised characters e.g. with their font sizes and position in the document are transferred to the Wordbuilder 411.

Even though examples of OCR tasks are mentioned here, it is understood that the OCR scan can be performed in any suitable way.

The jigsaw OCR 410 combines adjacent peephole images or recordings to form windows, e.g. 2, 4, 9 or 16 peephole images, which then are subjected to OCR in an iterative process. The jigsaw OCR 410 interacts with the Scan Sequencer 407 and requests which adjacent peephole it needs to make a complete image of a character. Each scan combined with the up to eight adjacent scans is analyzed for recognition of characters or parts of characters, lines and pictures.

The Wordbuilder 411 receives from the OCR 409 and the jigsaw OCR 410 characters, one by one e.g. including their font sizes and positions. The string of characters includes equivalent space/blank characters and linefeed. The Wordbuilder 411 assembles the characters into words and an index-list is provided, which contains the words from the document. The index-list may be compared with a keyword list to find any keywords in the document. Words or characters which are found in the document may be blanked/cleared or replaced by a special character. Areas with pictures, photos and the like may be replaced with a predefined grey-tone or a pictel. The jigsaw OCR scanning combined with space-characters and a vertical line detection may evaluate the likelihood of a column separation in a given area of the page, and may take this information into account when processing the content of the document.

Finally after end scanning of a page the HIT collector 412 may have assembled a list of words and e.g. title lines, and the resulting output can be an index-list of words and the position of the words in the document, or it can be any other suitable output form. Afterwards the index-list can be matched with a keyword list to find if any keywords are present in the document.

Alternatively and/or additionally, in some embodiments, the processing of the text on the document being scanned may comprise machine translation (MT), which is a field of computational linguistics where computer software is used to translate text from one language to another. Basically, machine translation performs simple substitution of words in one language for words in another language. The machine translation may be rule-based machine translation, example-based machine translation, statistical machine translation (SMT) etc.

Alternatively and/or additionally, in some embodiments, the processing of the text on the document being scanned may comprise rewording or rephrasing, i.e. the word or sentences of the text may be reworded or rephrased into different words or sentences of the same language with the same meaning as the original word or sentences. When using the method according to the present invention, for example three words are scanned, stored in the memory, and then processed. A meaning or sense of the three words is generated by means of a software program, and one or more synonymous words or a synonymous sentence for the three original words are generated. Hereby, an equivalent word, sentence or text of an original word, sentence or text is generated, having the same meaning or sense as the original but without violating copyright laws. It is understood that more or less than three words may be processed for rewording or rephrasing the original text or part of the text.

Figure 4:
FIG. 4 shows sections of a newspaper page overlaid with reading-head movements.
Figure 4:
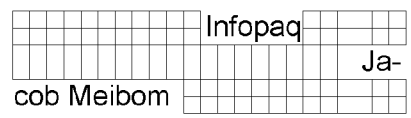

FIG. 4a shows a section of a fictive front-page of a newspaper overlaid with the reading-head movements, where the scanning in overall terms functions like in FIG. 1. The starting point is in the upper left corner of the document page. The first 3 peephole scans (PH-scans) 501, 502, 503 will be marked no-content and cleared or overwritten by blanks (approximately same colour). The fourth PH-scan, PH4, 504 contains information, but no characters are recognized by the OCR. A fifth vertical PH-scan, PH5, 505 is therefore requested and combined with PH4. The OCR looks at the combined scan PH4+PH5 and detects the characters "Thurs" and something more. The scan-sequencer requests a sixth and a seventh scan, PH6, 506, and PH7, 507. Scan PH4+PH5+PH6+PH7 are combined and presented to the jigsaw OCR. The OCR returns the word "Thursday" and the characters "30*t*" and something more. The scan-sequencer continues by requesting the next scans. The word "Thursday" and e.g. its font size may be transferred to the Word Recognizer. Due to the font size the word may be categorized as belonging to a header or title sentence. With the next scans, the word "Newspaper" will be recognized etc.

FIG. 4b shows scanning of body text, which follows a similar search-strategy, as shown in FIG. 1, and step-by-step uncover character for character and assembles word for word, where each word is saved in an index-list. The index-list may then be compared with a keyword list. If a word is not found in the keyword list, then the area occupied by the word may be overwritten with blanks.

The example in FIG. 4b shows a vertical scan sequence. The search process uncovers the following words "Infopaq", the first name "Jacob" (neglecting the continuation sign) and finally the surname "Meibom" in the shown text piece. Any pictures in a document may be blanked.

Figure 5:
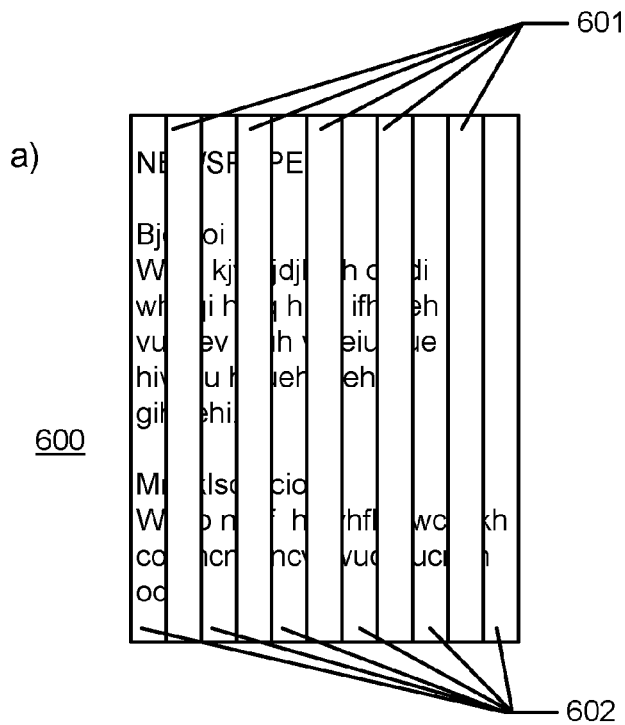
FIG. 5 shows an example of a peephole scanning process.

FIG. 5 shows an example of a peephole scanning process, which in overall terms functions like in FIG. 1. In FIG. 5*a*) the document 600 to be scanned has been partly hidden or covered in areas 601 with a covering of some kind prior to scanning. When the covered document shown in FIG. 5*a*) has been scanned, and the content and image have been processed and deleted, then, as sent in FIG. 5*b*), the document 600 is again partly hidden or covered but now in opposite areas 603 with a covering of some kind prior to scanning.

As shown in FIG. 5*a*), when scanning the partly covered document in for example a conventional scanner, a copy of the document is not produced, since the entire content of the document is not visible or comprehensible due to the partial covering. Thus only a delimited area 602 of the document is scanned and stored in the memory of the scanner. The scanned image of the partly covered document is processed to perform optical character recognition (OCR). The registered characters are stored in the memory, and when a string of characters is obtained, the string is evaluated against a predefined condition. Depending on whether the predefined condition is satisfied or not, an output may be provided, and at least a portion of the string and at least a portion of the scanned image are cleared from the memory, and thus the content of the scanned image, which only represents a part 602 of the document 600, and the scanned image itself are at least partly deleted. Thus, eventually the entire scanned image, which only depicted a part 602 of the document 600, may be deleted, and thus the scan of that part 602 of the document 600 is no longer stored in the memory.

Now, as seen in FIG. 5*b*), the same document 600 is partly hidden or covered on the opposite areas 603 than before. As mentioned above, when scanning the partly covered document in for example a conventional scanner, a copy of the document is not produced, since the entire content of the document is not visible or comprehensible due to the partial covering. Thus only a delimited area 604 of the document 600 is scanned and stored in the memory of the scanner. The scanned image of the partly covered document is processed to perform optical character recognition (OCR). The registered characters are stored in the memory, and when a string of characters is obtained, the string is evaluated against a predefined condition. Depending on whether the predefined condition is satisfied or not, an output may be provided, and at least a portion of the string and at least a portion of the scanned image are cleared from the memory, and thus the content of the scanned image, which only represents a part 604 of the document 600, and the scanned image itself are at least partly deleted. Thus, eventually the entire scanned image, which only depicted a part 604 of the document 600, may be deleted, and thus the scan of that part 604 of the document 600 is no longer stored in the memory.

Thus, when initiating the scanning of the document 600 covered in areas 603, as in FIG. 5*b*), the scanned image of document 600 covered in areas 601, as seen in FIG. 5*a*), has been deleted, and thus a complete image depicting the entire document 600 will never exist. The part 602 of the document 600 will be recorded, processed and cleared from the memory, before the part 604 of the document 600 is recorded, processed and deleted.

The areas 602 and 604 may overlap each other, such as a partial overlapping, for ensuring that no parts of the document are lost, if for example the covered areas 601 and 603 are skew, or if the recording is somehow skew.

The covering 601, 603 may be provided by physically placing a non-transparent material or subject on the part of the document 600 to be covered. Alternative and/or additionally, the covering 601, 602 may be provided by physically placing a non-transparent material or subject on the reading head or glass pane of the scanner. The cover material may be e.g. paper, non-transparent tape, non-transparent plastic, metal and/or the like.

Alternatively, the covering 601 and 603 may be provided by means of an electronic masking or gating of the reader head. A scanline may for example be 1 pixel in the height and 3000 pixels lengthwise. The reader head may then scan a portion of each scanline of the document and delete another portion of each scanline. For example, the reader head may scan a first portion of a scanline, such as pixel number 1-100, delete a second portion of the scanline, such as pixel number 100-200, scan a third potion of the scanline, such as pixel number 200-300, delete a fourth portion of the scanline, such as pixel number 300-400 and so on, until each portion of every scanline is either scanned or deleted. Then after processing all the scanned portions of the scanlines, they are cleared from the memory, and now all the portions of the scanlines, which were not scanned but deleted before, are scanned, and the portions of the scanlines which were scanned before, are now deleted, such as deleting the first portion of the scanline, such as pixel number 1-100, scanning the second portion of the scanline, such as pixel number 100-200, deleting the third portion of the scanline, such as pixel number 200-300, scanning the fourth portion of the scanline, such as pixel number 300-400 etc. Deleting a portion of a scanline comprises that no input is made to the memory, i.e. the content of the portion of the scanline is suppressed or disregarded.

On a newspaper page a letter or character may be 15-20 pixels in the height, and a page may be 3000 pixels in the length, corresponding to a scanline as mentioned above. Thus by scanning or deleting portions of a scanline, an electronic masking corresponding to the covering seen in FIG. 5 can be obtained.

Furthermore, pictures are typically in greyscale or colour variation, and when greyscale or colour variation on a document is detected by the scanner, such as for example by the reader head, the pixels containing greyscales or colour variation are assigned a certain value, and all pixels having this certain value are then cleared or covered up for hiding the content of these pixels, which could be a picture.

The form and shape of the covering 601, 603 can be columns as shown in FIG. 5. Alternatively and/or additionally, the form and shape of the covering 601, 603 may be squares, check patterns, grates, triangles, circles, lines, polygons with any number of sides etc.

The invention claimed is:

1. A computer-implemented method of scanning a document, comprising the steps of:
    acquiring to a memory at least one recording confined to a field that covers a delimited area of a document;
    processing the at least one recording to perform character recognition;
    when a character is recognized, registering it in the memory; and performing the above steps repeatedly while recording at shifted positions so as to progressively obtain a string of characters; —evaluating the string against a predefined condition;
    if the condition is not satisfied, determining whether to clear from the memory at least a portion of the at least one recording; and
    if the condition is satisfied, provide an output and clear from the memory at least a portion of the string and at least a portion of the at least one recording.

2. A computer-implemented method according to claim 1, wherein the predefined condition comprises that the string of characters comprises at least one word.

3. A computer-implemented method according to claim 2, wherein an index list is provided comprising the at least one word.

4. A computer-implemented method according to claim 3, wherein the output comprises the index list and a reference to a position representing the location of the corresponding word in the document subjected to scanning.

5. A computer-implemented method according to claim 2, wherein the at least one word is cleared from the index list, if the word matches one of a predefined stop-word.

6. A computer-implemented method according to claim 2, wherein a word is identified in that there is a space before and after the word.

7. A computer-implemented method according to claim 2, wherein a word is identified in that there is a space before the word and a character different from a letter after the word.

8. A computer-implemented method according to claim 2, wherein a word is identified by means of a database comprising every word in one or more languages, and if there is a match between the string of characters and a word in the database, said string of characters is defined as a word.

9. A computer-implemented method according to claim 1, wherein the output is the at least one word.

10. A computer-implemented method according to claim 1, wherein the output is a reference to a location in the document where the at least one word is located.

11. A computer-implemented method according to claim 1, wherein information about location/position in the document of the at least one word is generated and stored.

12. A computer-implemented method according to claim 1 wherein the at least one word is represented as a code.

13. A computer-implemented method according to claim 1, wherein a generated keyword list comprises a number of predetermined keywords.

14. A computer-implemented method according to claim 13, wherein the keyword list is compared to the index list, and, if there is a match between a keyword in the keyword list and a word in the index list, this word is extracted.

15. A computer-implemented method according to claim 1, wherein, if condition is not satisfied, determining whether to clear from the memory at least a portion of the at least one recording, comprises: determining the number of evaluated characters; and
    if less than a predefined number of characters is evaluated, at least a portion of the at least one recording is not cleared; and
    if more than or equal to a predefined number of characters is evaluated, at least a portion of the at least one recording is cleared.

16. A computer-implemented method according to claim 1, further comprising determining whether to clear from the memory at least a portion of the string, if condition is not satisfied.

17. A computer-implemented method according to claim 1, comprising stitching together selected recordings to a compounded recording.

18. A computer-implemented method according to claim 17, wherein the compounded recording is processed to perform recognition of a character extending across multiple selected recordings.

19. A computer-implemented method according to claim 17, wherein a step of stitching together selected recordings to a compounded recording is performed when processing of the at least one recording to recognize a character did not result in recognition of a character.

20. A computer-implemented method according to claim 1, wherein the predefined condition comprises whether stitched compounded recordings result in recognition of a character when a predefined number of recordings has been stitched.

21. A computer-implemented method according to claim 1, wherein the predefined condition comprises that fewer than a predefined number of characters is evaluated.

22. A computer-implemented method according to claim 1, wherein the predefined condition comprises that the character font size is less than a predefined font size.

23. A computer-implemented method according to claim 1, wherein the predefined condition comprises that the same colour occurs in neighbor recordings.

24. A computer-implemented method according to claim 17, wherein the compounded recording is cleared when a predefined condition is satisfied.

25. A computer-implemented method according to claim 1, wherein the field is configured to have a dimension of 11 words arranged next to each other in a consecutive text.

26. A computer-implemented method according to claim 1, wherein the field is configured to have a dimension corresponding to the width of the document and the height of the font size of the characters.

27. A computer-implemented method according to claim 1, wherein the field is configured so as to have a dimension less than five times the size of the smallest character subject to character recognition.

28. A computer-implemented method according to claim 1, wherein at least two recordings are acquired simultaneously.

29. A computer-readable non-transitory medium encoded with a program implementing the method according to claim 1 when run on a computer.

30. A system comprising a scanning device and a computer loaded with a program implementing the method according to claim 1 when the program is run on the computer.

31. A document scanner comprising:
- a scanning head for acquiring at least one recording confined to a field that covers a delimited area of a document;
- a processor adapted to recognize a character in the recording;
- a data memory for storing the at least one recording and for storing a recognized character; and
- a program memory storing a set of executable program instructions on the processor to perform the method according to claim 1.

* * * * *